United States Patent
Schiff et al.

(10) Patent No.: US 7,756,744 B2
(45) Date of Patent: Jul. 13, 2010

(54) USER-DRIVEN DATA NETWORK COMMUNICATION SYSTEM AND METHOD

(75) Inventors: Eyal Schiff, Tel Aviv (IL); Tamir Koch, Tel Aviv (IL)

(73) Assignee: Dotomi, Inc, Chicago, IL (US)

( * ) Notice: Subject to any disclaimer, the term of this patent is extended or adjusted under 35 U.S.C. 154(b) by 1300 days.

(21) Appl. No.: 10/169,265

(22) PCT Filed: Jul. 26, 2001

(86) PCT No.: PCT/IL01/00687

§ 371 (c)(1),
(2), (4) Date: Apr. 7, 2003

(87) PCT Pub. No.: WO02/10998

PCT Pub. Date: Feb. 7, 2002

(65) Prior Publication Data

US 2003/0158777 A1 Aug. 21, 2003

(30) Foreign Application Priority Data

Jul. 31, 2000 (IL) ...................................... 137603
Mar. 19, 2001 (IL) ...................................... 142100

(51) Int. Cl.
*G06F 170/60* (2006.01)
(52) U.S. Cl. .............. 705/14.55; 705/14.49; 705/14.51; 705/14.56; 705/14.73; 705/14.68
(58) Field of Classification Search ................... 705/10, 705/14, 39, 27, 23, 14.49, 14.51, 14.56, 14.68, 705/14.73; 715/716
See application file for complete search history.

(56) References Cited

U.S. PATENT DOCUMENTS

| | | | |
|---|---|---|---|
| 5,717,923 A | 2/1998 | Dedrick | |
| 5,721,827 A | 2/1998 | Logan et al. | |
| 5,740,549 A | 4/1998 | Reilly et al. | |
| 5,754,938 A | 5/1998 | Herz et al. | |
| 5,754,939 A | 5/1998 | Herz et al. | |
| 5,796,952 A | 8/1998 | Davis et al. | |
| 5,848,396 A | 12/1998 | Gerace | |
| 5,933,811 A | 8/1999 | Angles et al. | |
| 5,995,098 A * | 11/1999 | Okada et al. | 715/752 |
| 6,009,410 A | 12/1999 | LeMole et al. | |
| 6,055,542 A | 4/2000 | Nielsen et al. | |
| 6,061,681 A | 5/2000 | Collins | |
| 6,081,840 A | 6/2000 | Zhao | |
| 6,341,305 B2 * | 1/2002 | Wolfe | 709/203 |
| 6,708,205 B2 * | 3/2004 | Sheldon et al. | 709/206 |

(Continued)

*Primary Examiner*—James W Myhre
*Assistant Examiner*—Michael Goldman
(74) *Attorney, Agent, or Firm*—Marsteller & Associates P.C.

(57) ABSTRACT

A system is disclosed for messaging over a data network, such as the Internet and interactive TV, which allows every registered user to generate and update one or more user portfolio(s) containing information relative to Providers and/or individuals of which the user is willing to view their messages. The messages are displayed inside the space of the webpage where usually banners are shown. The system may provide benefits to the user upon displaying messages with commercial value to him. The disclosed messaging system allows an easy and effective communication path between providers and users any time publicly or privately in the banner area of a web site, which does not occupy additional space on the user's browser, and does not require the user to load another application besides his browser.

34 Claims, 12 Drawing Sheets

U.S. PATENT DOCUMENTS 7,103,671 B2 * 9/2006 Quiggle et al. .............. 709/231
7,171,448 B1 * 1/2007 Danielsen et al. ........... 709/205
7,225,142 B1 * 5/2007 Apte et al. .................... 705/14
7,469,222 B1 * 12/2008 Glazer ......................... 705/27

* cited by examiner

User Z180625Y
Queuing Messages

| Company | Banner No. | Price | Valid Unit | No. of Exposures |
|---|---|---|---|---|
| Company A | 2654888 | $0.18 | 10/04/2000 | 2 |
| Company B | 5652909 | $0.16 | 21/05/2000 | 5 |
| Company C | 6542865 | $0.13 | 13/09/2000 | 2 |
| User A | 7891250 | $0.11 | 9/09/2000 | 1 |
| Company E | 1152549 | $0.08 | 5/05/2000 | 3 |
| Company F | 5378326 | $0.07 | 1/09/2000 | 4 |
| Company G | 6435644 | $0.04 | 03/08/2000 | 1 |
| User B | 8743656 | $0.01 | 11/11/2000 | 5 |

*Fig. 5*

USER-DRIVEN DATA NETWORK COMMUNICATION SYSTEM AND METHOD

FIELD OF THE INVENTION

The present invention relates to data networks. More particularly, the invention relates to a user-driven communication system and method, which is useful for the direct communication of a services and goods provider with an Internet surfer, an Internet surfer with other surfers or interactive television (iTV) users.

The invention enables a surfer and/or an iTV user to influence, fully or in part, the advertising space content to which he is exposed while surfing the internet and/or using iTV.

BACKGROUND OF THE INVENTION

Marketing over the Internet is a very large business. Many efforts and large sums are spent on advertising to surfers and keeping contact with clients. This is done in many ways, including the posting of banners, the pushing of advertisement in the form of web pages, such as Hyper Text Markup Language (HTML) pages, and the redirecting of surfers to specific sites in affiliates programs, and e-mail marketing of text or HTML pages.

The Internet community has begun to realize that some of the existing advertising schemes lack efficiency for a variety of reasons, all of which are rooted in the lack of interest of the surfer toward a large majority of the advertisements shown to him. The art has tried to solve this problem in many ways. For instance, pay-for-click schemes have been implemented, which pay the surfer for viewing an advertisement. An alternative approach is to attempt to determine the surfer's interests, by presenting him with information relating to issues found in web-sites that he has visited. However, all the prior art methods have not succeeded in overcoming the problem of decreasing attention of the surfer toward advertisements.

One approach to the personalization of the advertisements directed to a specific surfer provides for the learning of the surfing habits of a surfer. Such systems follow the surfer, learn his interests by acquiring data on the web-sites visited, and deduce therefrom potential user preferences. Advertisements are then displayed selectively to the surfer, based on such deducted preferences. These methods are of low efficiency, however, since not always a site visited is visited because of a voluntary interest of the surfer, and also because the deduction of the surfer's preferences is often incorrect. The result is that there is only a slight improvement, if any, in the interest taken by the surfer in the advertisements being shown to him.

A similar method is described in U.S. Pat. No. 5,933,811, in which the surfers are required to fill-in a profile, containing personal information which is then used to decide which advertisements to display to him. This system, as other prior art systems, are all based on the assumption that it is possible in this way to improve the correlation between the advertisements sent to the user and his actual preferences. This assumption has, so far, not produced sufficiently improved results. None of the prior art methods has provided a method by which the user is the one who requests messages from specific vendors to be shown to him, which is an aim of the present invention, as opposed to the methods described above in which the system decides what and when to show to him.

Advertising methods on iTV via a cable television operator, or direct broadcast satellite TV are similar to the advertising methods that were described hereinabove in accordance to the Internet, therefore all the above drawbacks applies to iTV as well.

Many methods have been provided in the art for the communication between different surfers. In this context, communication is intended to relate to communication during surfing and/or using iTV, and not to messaging methods which are not browser related, such as e-mail. The existing methods are limited to either billboards, in which one surfer can leave messages on a web site for every surfer to see, or chats of various types, in which a surfer can communicate on-line with one or more different surfers. Chat rooms often provide privacy options, that permit two surfers to carry out a private conversation. However, the art has so far failed to provide an efficient method by means of which a surfer may communicate off-line (or on-line) with another surfer, in a private manner, via their browsers, without the need to access a chat room or similar web-site.

It is therefore an object of this invention to provide individual communication methods and systems that overcome the problems of the prior art, and which allow an easy and effective communication to take place between a service or goods provider and a surfer.

It is another purpose of this invention is to provide individual communication methods and systems for permitting off-line (as well as on-line) communication between surfers, using their web browsers, without the need to employ additional systems, such as e-mail applications.

It is yet another object of the invention to provide a user-driven advertisement method and system which increases the effectiveness of advertisements that reach the user. Furthermore, where an ISP or portal has the choice of showing a surfer a number of banners, it will choose those banners desired by the surfer. In this way, undesired banners will not be shown to him, or the number of those will be reduced.

It is also an object of the invention to provide a system in which the user has control over the messages shown to him, to the extent that he may decide to block access to him through his portfolio, temporarily or permanently, at any time, simply by changing parameters in his portfolio, the nature of which will be explained below.

Another object of the invention is to allow advertisers to send personal marketing messages, the cost of which depends on "the value" of each segment of consumers receiving the messages, and allowing them to pay a different amount of money for the exposure of each group of consumers to a different advertisement.

A further object of the invention, is to create a mechanism that allows commercial companies to pay for the content that each of their different "valued" customers is receiving for free from content providers.

Other purposes and advantages of this invention will appear as the description proceeds.

SUMMARY OF THE INVENTION

The invention is directed to a method for messaging over a data network, comprising the steps of:
i) providing an Administration Server (AS) in which user portfolios are stored, said AS being in communication with a terminal belonging to a user;
ii) allowing every registered user to generate and update one or more user portfolio(s) containing information relative to Providers and/or individuals the messages of which the user is willing to view; and
iii) displaying to one or more users on their terminal messages according to the information contained in the user portfolio.

If the messages have a commercial value, the method further comprises the steps of:

iv) providing benefit(s) to the user for messages displayed to him; and v) debiting the Provider for messages displayed to said one or more users.

Throughout this specification, everything that is said with reference to providers applies. Mutatis mutandis, also to portals, and the skilled person will easily appreciate the changes in procedures required when a portal is involved in the distribution of the messages, and the related appartitioning of revenues.

Preferably, the data network is the Internet. However, as will be appreciated by the skilled person, any other wide area network can exploit the invention, such as a cable television network, and the invention is therefore not limited to be used in any particular environment or communication protocol.

In a preferred embodiment of the invention the messages are displayed in a space of a web page belonging to a portal or web site, in which banners are normally displayed or destined to be displayed. This, as will be apparent to the skilled person, greatly increases the attention of the surfer to the advertisement and banner areas.

According to another preferred embodiment of the invention the information contained in the user's portfolio comprises an indication of a viewing priority for each Provider. According to still another preferred embodiment of the invention the message comprises an advertisement.

The terminal can be any device with Internet connectivity or with any other digital media connectivity, e.g., a Personal Computer (PC), a hand-held device, a cellular telephone or a TV set or equipment connected thereto. The advertisement should preferably be in a form that can be viewed on a graphical, textual or audio and/or video application which enables to view messages on the Internet or the like network, and should more preferably be in a form that can be viewed on a web browser page.

A preferred embodiment of the invention provides for the attachment of start and end dates before and after which the message cannot be displayed, to messages to be displayed. Furthermore, differential values for the displaying to specific customers or groups of customers can also be attached.

In another aspect, the invention is also directed to a system for messaging over a data network, particularly the Internet, comprising:

i) an Administration Server (AS) provided with storage means in which user portfolios are stored, ii) a terminal belonging to a user, said terminal being in communication with said AS;

iii) means for allowing every registered user to generate and update user portfolios containing information relative to the Providers and the individuals the messages of which the user is willing to receive while exposed to digital media; and iv) display means associated with the user's terminal, for displaying to said one or more users messages according to the information contained in the user portfolio.

If the messages displayed have a commercial value, meaning that the provider may be willing to pay the user for displaying to him the messages, the system may further comprise:

e) means for providing benefits to the user for advertisements displayed to him; and f) means for debiting the Provider for advertisements displayed to said one or more users.

The system may further comprise an additional server, said additional server comprising means for generating messages. The additional server can be, e.g., a Rich Media Campaign Server (RMCS).

The invention also encompasses a method for communicating between two or more users of a data network, particularly of the Internet, comprising the steps of:

i) providing an Administration Server (AS) in which user portfolios are stored, said AS being in communication with a terminal belonging to a user;

ii) allowing every registered user to generate and update a user portfolio containing information relative to surfers the messages originating from whom or which the user is willing to view; and iii) displaying to one or more users on their terminal messages according to the information contained in the user portfolio.

All the elements described above with reference to the method apply also to the system, and are therefore not described again in detail, for the sake of brevity.

The user can be recognized in any suitable way. According to a particular embodiment of the invention, the user is recognized by saving a cookie on his terminal. This may be convenient, e.g., when the user accesses the AS system from a temporary terminal, such as a public terminal, in which the user logs-in into his portfolio, and requests that the browser from which he is temporarily surfing be identified as belonging to him for a limited period of time, whereby a "temporary cookie" is stored or kept on said temporary terminal. The user may then void the cookie by actively logging-out of the system.

According to a preferred embodiment of the invention the system comprises means for notifying the AS of the current identity of the person who is surfing from a computer at a given time. Said means may comprise, for instance, an external client, embedded sources or subroutines, ActiveX controls (wherein ActiveX is software modules that enables a program to add functionality by calling ready-made components that blend in and appear as normal parts of the program), or suitable browser plug-ins or components.

The system of the invention may function as a stand alone person-to-person communication system not connected to an advertising messaging system, and does not necessarily have to be connected to a server that provides advertising services, although it may be convenient in many cases to do so.

BRIEF DESCRIPTION OF THE DRAWINGS

FIG. 2C is an example of a registration process and the addition of a company using a browser plug-in;

FIG. 5 is a user's table displaying data from the AS database, showing the details of banners that the user is scheduled to see;

DETAILED DESCRIPTION OF PREFERRED EMBODIMENTS

Figure 1A:
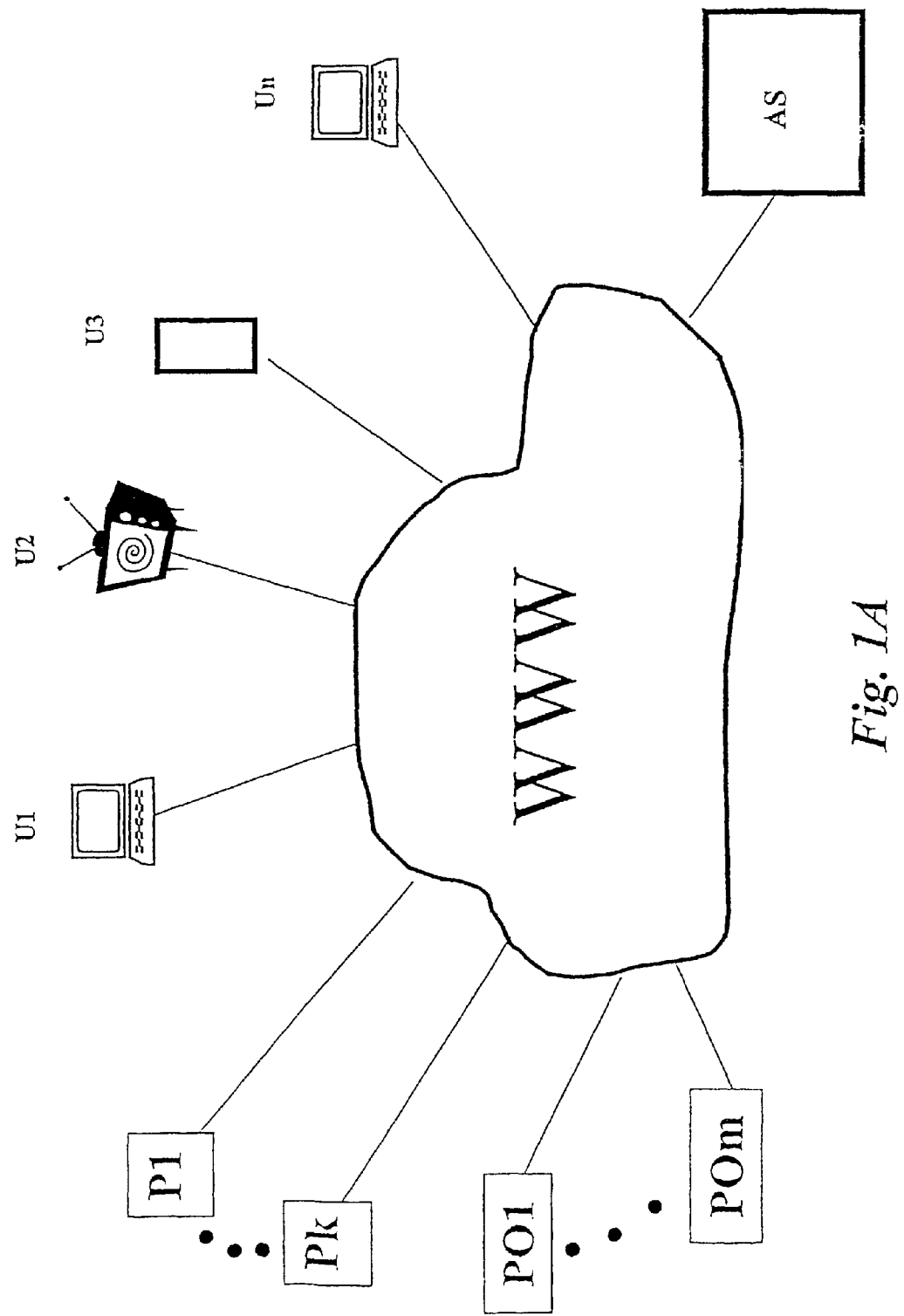
FIG. 1A is a schematic general view of a system according to a preferred embodiment of the invention.

Throughout this specification, the following definitions are employed:

- Cookie: in the context of this invention, any technological way to identify the device the user is using such as browsers cookies, plug-ins, native applications CPU, TV set-top box, unique codes, a constant Internet Protocol (IP) address of a mobile phone, etc.
- Message Sender: another surfer or a company to which the user is registered;
- Surfer: a user of a suitable connection program, such as a browser program, connected to the web via any suitable peripheral, such as a computer, a cellular phone, a cable TV, etc., also referred to as "user", "consumer" or "customer";
- Terminal: Any suitable connection apparatus, including but not limited to computers, cellular phones, cable TV, etc.;
- Portal: A content provider; or a cable operator or an AD Network of electronic devices;
- AS (Administration Server): The server that operates the system of the invention, which contains data relative to all the users' portfolio, and additional programs and utilities, for example, the interfaces that enable the user to edit his portfolio, a database of the content provided by the providers, the billing system, an interface for the portals ad servers. The AS may physically be one or a plurality of servers, which may be physically located at the same or at different locations on the net. Furthermore, parallel work of a plurality of ASs is also possible;
- Company: any entity that can be included in a user's list and which can send advertising material to him, including but not limited to, commercial companies, non-profit organizations, governmental agencies, private persons, etc.
- Provider: a supplier of services and/or of goods, including but not limited to commercial companies selling goods or services, governmental agencies, non-profit organizations, political organizations, and the like.
- Banner: any type of information or message, graphical or textual, that can be retrieved and usually viewed by any suitable viewing program, such as a web browser, a mobile telephone browser, a television browser, etc., including but not limited to, prior art banners, any form of Interactive Marketing Units (IMU) recommended by the Internet Advertising Bureau (IAB), HTML pages, messages generated in situ by downloadables, such as Java applets or ActiveX elements, cellular phone text messages, cellular phones video advertisements, interactive TV (iTV) banners or full screen commercials, SMS messages full or in parts, etc.
- Advertisement: any type of information that a Provider wishes to bring to the attention of a surfer, including but not limited to, advertising material, product information, news, personal messages, interactive movies through the web, advertising movies in interactive TV, etc.
- AD server: A server that chooses and controls the advertisements appearing in the content that is being served, or connected to another analytical server that instruct it what to present. It is important to mention that AS can be connected to one or more AD servers for providing them messages relevant to their surfers.
- Portfolio: A list of providers or surfers authorized to send messages to the user via an AS server, upon verification by the AS server that the sender is an authorized sender.
- Rich Media Campaign Server (RMCS): A server used by a provider/sender to send messages to registered users.

Looking now at FIG. 1A, a system according to a preferred embodiment of the invention is shown, in simplified form. The system comprises four basic entities: users, providers, portals and the AS. All these entities are connected through the AS.

The plurality of users, $U_1$-$U_n$, are registered users and possess an account on the AS, and, of course, have connectivity to the AS through any type of communication system.

The Plurality of providers and any other senders, $P_1$-$P_k$, can send content to the AS by any type of communication system or by the RMCS.

A Plurality of portals, $PO_1$-$PO_m$, provide users with their own contents, as well as with content obtained from the AS, which includes the contents that were stored by the providers in the AS.

In the example of FIG. 1A, the various entities are connected via the Internet, but of course they can be connected in any other way and via any other data network, such as Wide Area Network (WAN) or Local Area Network (LAN), including the LAN of a cable television operator, or direct broadcast satellite TV, and exploiting their digital capabilities (i.e., the use of iTV). The providers can be of any type. The users can use any suitable communication terminal, including but not limited to, computer terminals, e.g., a PC, a cellular phone, a palm computer, etc. As will be appreciated by the skilled person, the interface used by the user to communicate with the AS and the Internet will vary according to the type of terminal employed. For instance, if a cellular phone is employed, connection can be via standards, such as Wireless Application Protocol (WAP), I-MODE, CHTML, XHTML, etc. The interface suitable for each type of terminal, however, is well understood by the skilled person, and is therefore not discussed herein in detail, for the sake of brevity.

Figure 1B:
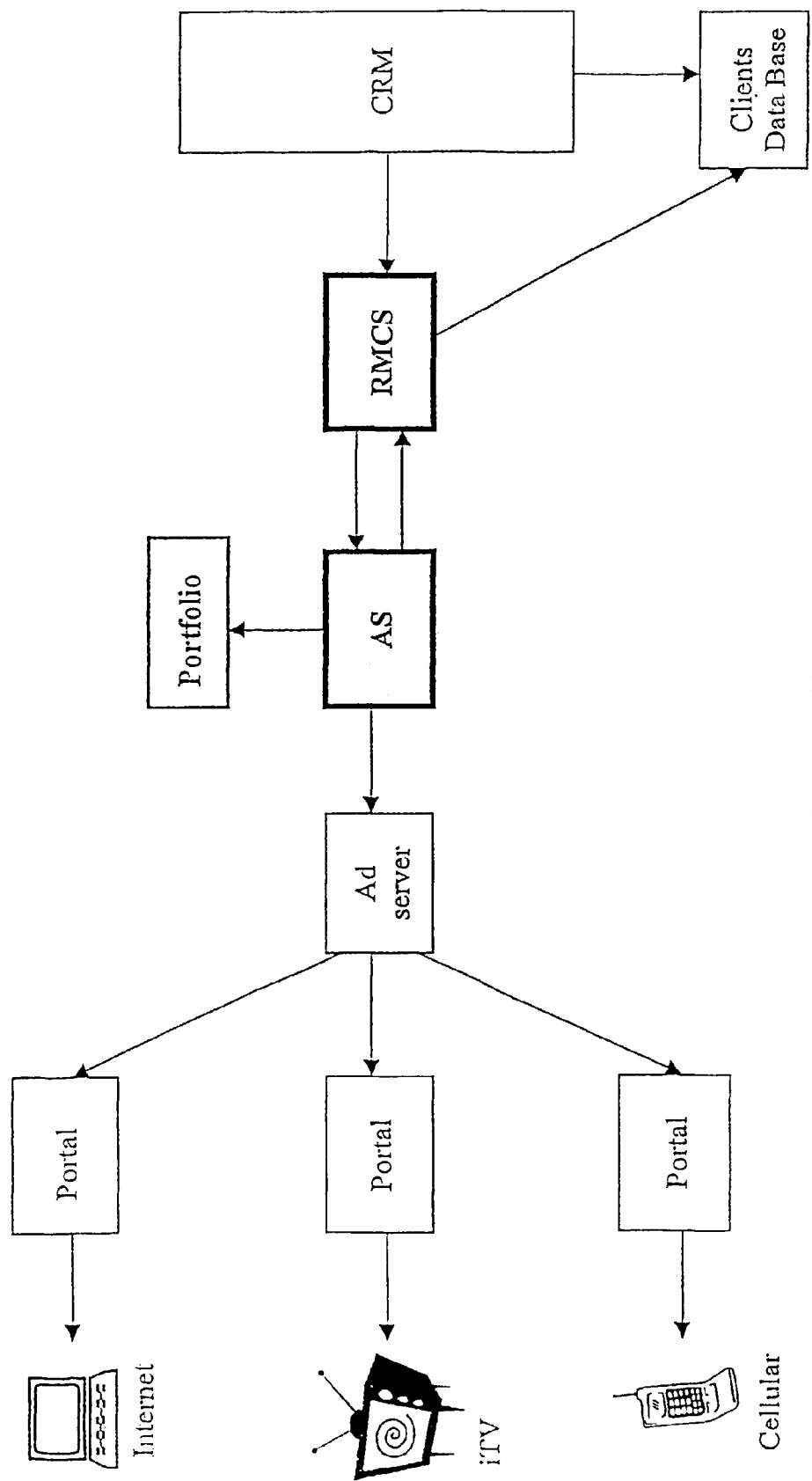
FIG. 1B is a schematic general view of a system according to another preferred embodiment of the invention.

Looking now at FIG. 1B, a system according to another preferred embodiment of the invention is shown, in a block diagram form. The system comprises eight basic entities: users, providers, portals, Ad server, AS, Portfolio, RMCS, Customer Relationship Management (CRM) and a clients database. All these entities are connected through a data network.

The plurality of users, such as an Internet user $U_1$, an iTV user $U_2$ and a cellular user $U_3$, are registered users and possess an account on the AS, and, of course, have connectivity to the AS through any type of communication system, such as Internet, iTV, cellular etc.

The providers and any other senders, can send content to the AS by any type of communication system or preferably by the RMCS. Each provider can have its own RMCS with which he connects to the AS, or a provider may connect to the AS via a public RMCS. Public RMCS, may be used also to deliver messages between registered users.

A Plurality of portals, $PO_1$-$PO_3$, provide users with their own contents, as well as with content obtained from the Ad server, which includes the contents that were stored by the providers in the AS. The Ad server is connected to the AS that provides it with message to display.

The RMCS is used for designing the template based message to be sent to one or more users, such as users $U_1$-$U_3$. RMCS may use any available clients database, whether the database is local or remote. In FIG. 1, it shown, for example, that the RMCS is connected to a remote client database that is used by CRM as well. Optionally, the RMCS may be implemented as integral part of a CRM (not shown).

The process of sending a template based message is based on a clients database, such as a CRM like database of customers, to a segment of the clients population from that database. This process is basically comprised of a marketing entity deciding the criteria by which a segment of population will be chosen. Next, a template or templates of messages are attached to that population (or parts of it). The following stage at the RMCS is building the corresponding file that holds all that relevant information and sending it to the AS to start the process of showing the relevant message to the relevant surfer (i.e., to one or more users among users $U_1$-$U_3$) with the relevant information. According to the preferred embodiment of the present invention, the way of displaying the messages to the users is non-intrusive and has the pre-requisite of the user's consent to showing him the messages.

The process is initiated by a user who registers with the AS and receives a unique identifier user name and password. The user's registration to companies process is schematically shown in FIG. 2 (A and B). Each user generates and keeps a portfolio, which is a list of advertisers and/or other users that he wishes to receive messages from. The portfolio, such as portfolio 10, can be generated in different ways.

Figure 2A:
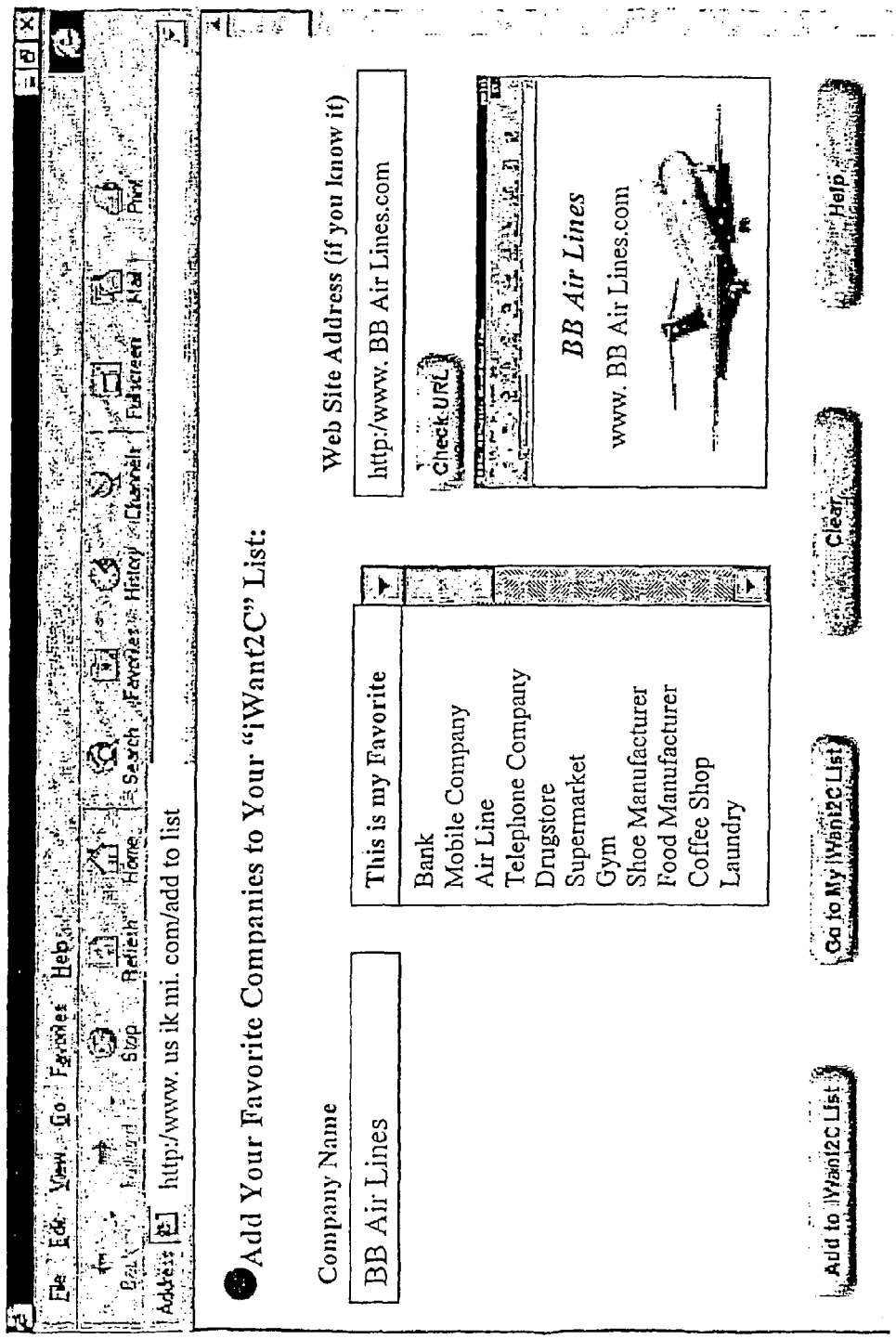
FIG. 2A is an example of a registration procedure according to a preferred embodiment of the invention, where the user adds companies to his personal portfolio, which procedure may include an active request from companies to send him messages, and authorizing the companies to send him messages.

One way to generate a list is illustrated in FIG. 2A. The user names the companies from which he wishes to get messages, via the AS while surfing the web. For example companies from which he is usually buying products and services, or companies and brands with which he is familiar. Such list can include companies that are not yet registered with the AS server. Thus, if sufficient surfers request to register with an entity that is not registered with the AS, this information may prime the AS and such entity to meet the demand of the surfers, so that the entity is included in the database of the AS.

Figure 2B:
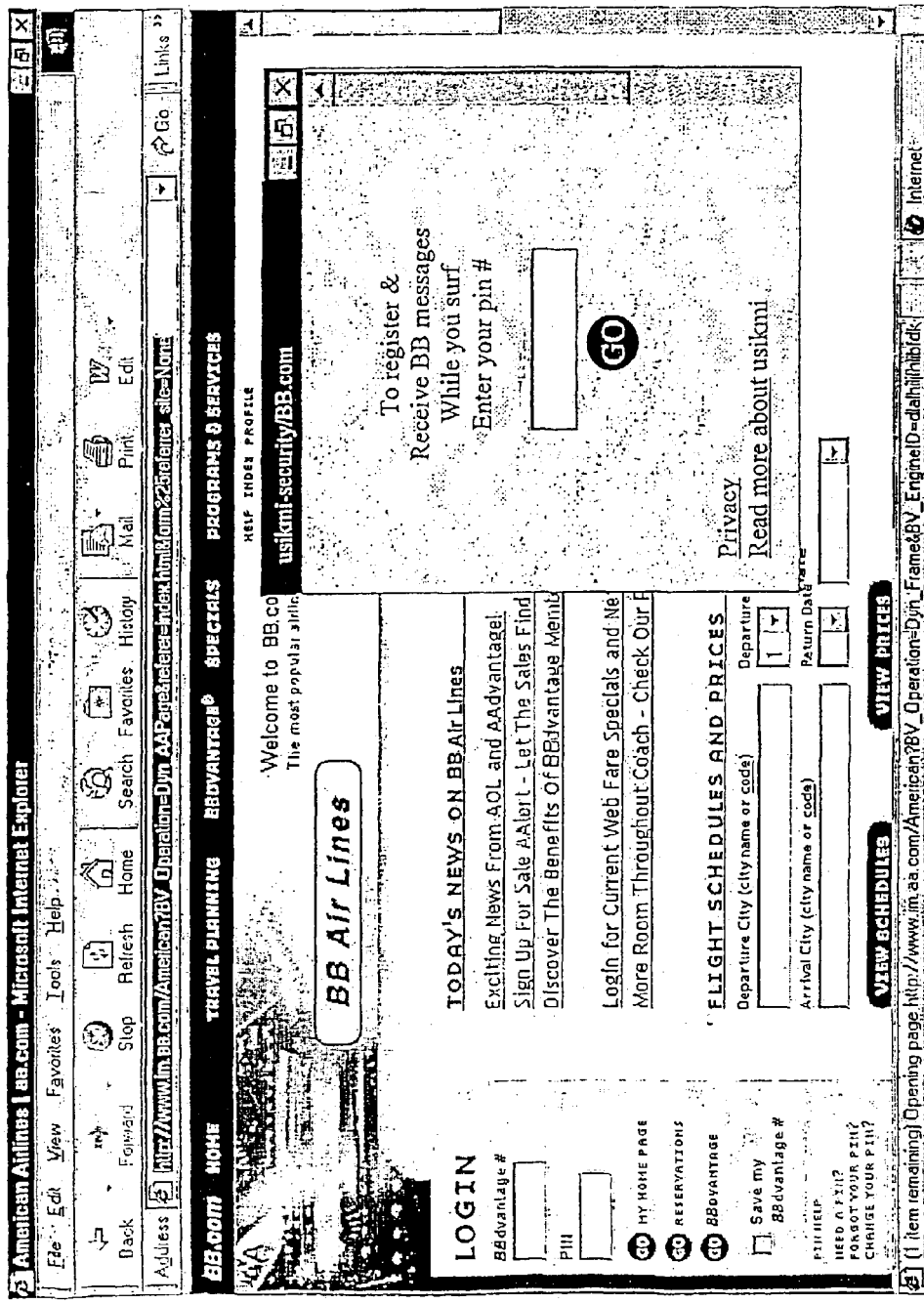
FIG. 2B is an example of a registration procedure according to another preferred embodiment of the invention, where registration is carried out at a the web site of a company.

According to another preferred embodiment of the invention, illustrated in FIG. 2B, the user is offered to add a provider to his portfolio while he is surfing the provider's site.

FIG. 2B illustrates a possible interface for this purpose. The user, who is surfing the BB Airline site, is offered to add this company to his portfolio on the AS. The interface is used to update the user's portfolio on the AS and the user details on the providers database.

This can be done in several ways. For example, the company can store information about an AS of a user (i.e., AS ID) and send it later on to the AS using the RMCS when it initiate a message sending process. Another possible way to operate is for the company or the AS to open a form that updates both the company database and the users portfolio on the AS.

An alternative way to operate is a system in which the company outsources the surfer registration process to a third party, or even to the AS itself.

Figure 2C:
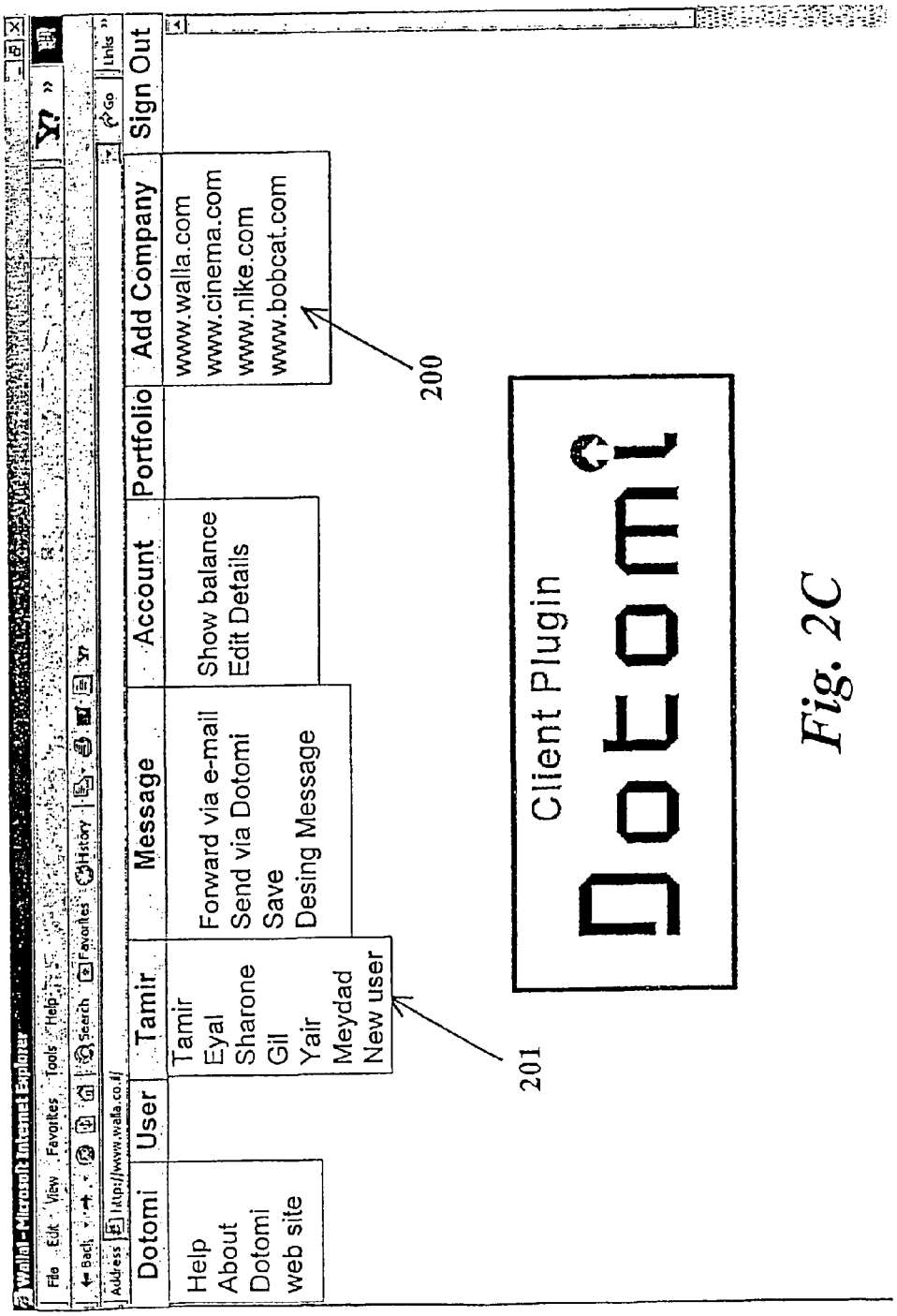

As stated, FIG. 2C is an example of a registration process and the addition of a company using a browser plug-in. This feature can be embedded into the browser functionalities, or can be added to any other plug-in that already exists on the user's browser, such as Yahoo massager (Yahoo! Inc.). According to the preferred embodiment of the invention shown in FIG. 2C, an "Add Company" button 200 is provided either as a plug-in or as a built-in function of a browser. Clicking button 200 causes the URL of the web site which the user is currently surfing to be added to his portfolio. Methods suitable to capture the URL and save it in a desired location are well appreciated by the skilled person, and are therefore not discussed herein in detail, for the sake of brevity.

The plug-in can be a Microsoft Explorer Rebar Control, or a cellular phone plug-in, or a set-top box plug-in. The AS can allow the user to give a unique name chosen by him, to the URL address that he sends to his portfolio. According to another preferred embodiment of the invention, a Name Server can be provided, with which the plug-in of the browser may communicate. The purpose of the Name Server is to provide a standardized naming system to all URLs. If, for instance, a user decides to click button 200 while he is in an inner page (low level) of a provider's web-site, it may be necessary to analyze the URL so as to extract therefrom the useful part, needed to identify the provider. For example, assuming that the URL line has, at the time of clicking, the following information:

http://patimg1.uspto.gov/.piw?Docid=05953504&-homeurl=http%3A%2F%2F164.195.100.11%
2Fnetacgi%2Fnph-Parser%3FSect1%3DPTO1%2526S
ect2%3DHITOFF%2526d%3DPALL%2526p%3D1%2526-
u%3D%2Fnetahtml%2Fsrchnum.htm%2526r%3D1%
2526f%3DG%25261%3D50%2526s1%3D'5.953.504'.
WKU.%25260S%3DPN%2F5.953.504%2526RS%3DP-
N%2F5.953.504&PageNum=&Rtype=&SectionNum=
&idkey= 4C1097DEFE97 which is the URL for the image of U.S. Pat. No. 5,953,504 at the USPTO web site, but all that the user is interested in is adding the URL of the USPTO to his portfolio. There is, therefore, a need to identify the parts of the URL that can be ignored, which is a relatively simple task, thanks to the slash marks at the beginning of the URL. However, even when removing all the part of the URL right of the third slash mark, the remaining URL is: http://patimg1.uspto.gov/, which is not the desired URL. The desired URL is http://www.uspto.gov/. It is therefore convenient to provide a Name Server, in communication with the plug-in, which can receive the URL saved by the plug-in when button 200 of FIG. 2C is clicked, and can perform on it logical operation and comparisons with lists of providers' names, and return to the plug-in a provider name or streamlined URL. Part of the operations can also be performed at the plug-in level, such as the trimming of the saved URL. Which operations will be performed at the plug-in level, and which, if any, at the Name Server level, will be determined according to the particular desired system.

According to an embodiment of the invention, The user can add any URL that he wished to his portfolio. The AS can open a section in a web site that allows Providers who own a specific URL to go and see the increasing number of users that requested to add this specific URL to their portfolio. When a Provider decides that it wishes to communicate with these, anonymous yet, AS users, the company will receive from the AS a list of all the users who have asked to register with their AS ID and the proper URL page in its web site that they decided to add it to their portfolio. The company then send through the AS a message to all these users requesting for other details that would match the AS ID to the customer ID in it's internal systems, but the company can also send non-personalized messages to these users, like product announcements, company news, etc. An alternative way can be that the AS would allow the users to store their personal data on the Plug-in, and as soon as the company start to activate the database of users who have registered it, the AS will contact all their plug-ins and instruct them automatically to send the user data to the RMCS which will then transfer it to the proper place of the consumers contact details.

This system is an alternative way for companies, other than making users to fill forms and request information.

According to still another preferred embodiment of the invention (not shown), it is possible to register with a service provider without being connected to the AS. This is simply done by a registered AS user, by giving his personal username at the AS to any provider which he wishes to include in his portfolio, at a physical location of the provider. An example may be, for instance, the filing-in of a suitable form in a shop, exhibition or on a flight, or registering in a special apparatus by typing in the AS ID details, or even synchronizing a bluetooth mobile device pre-configured to transfer AS ID while visiting a shop. The form is then used by the service provider to add itself to the user's portfolio. Knowledge of the user's username is treated in this case as an assurance that the user has given his permission to such addition, but the AS can further request the user to confirm each company registration and only then permit to add the sender to the user's portfolio of authorized senders Of course, the user may at any time, remove any service provider or sender from his portfolio.

According to a preferred embodiment of the invention, the AS creates for the user a global advertising number (the "AS ID") that the user can use in a variety of systems, in any way that he chooses, and which he can transmit to any provider. The user can add this number to his business card and turn it into a new means of communicating with him. In this way, any organization wishing to send announcements of new products or services to the user, can do so by sending them either to his e-mail account, or to his Instant messaging number, or using the AS number. A form of an AS ID can be for example "eyals&yahoo.com", using the "&" instead of "@" in e-mail addresses. In such circumstances, a user that has already an e-mail account or any kind of user account which is password protected with a portal, can be automatically generated with a default AS ID name which will make him easier to remember. The AS then can start receiving immediately messages for that specific user, and establish a list of companies that have that specific user e-mail address, and wants to send him messages to his AS account. As soon as the user activates his account for the first time, he will see a list of companies that want to send him messages via the AS. The user can change his AS ID to be very different from his e-mail address, so that companies that know his AD ID will not be able to send him unsolicited e-mail messages, but still the AS can put for user confirmation any request to send messages from companies knowing his e-mail address, and that try to use the AS ID with change of the separator (& replacing @, in this example).

According to a preferred embodiment of the invention an ISP (Internet Service Provider) can transfer to the AS the messages that are sent to his e-mail account users in a format to be presented by the AS. The ISP will then share with the AS revenues that are generated from messages presentation.

The personal list is called, in the examples of this specification, "iWant2C" (I want to see) list (hereinafter also referred to as "the list", or "the user's list").

Returning now to FIG. 2A, the surfer is provided with a list of possible services. In the example shown, the user stands on "Air Line", and can select from a list of available airlines (not shown). Of course, if the user stands on another type of provider, e.g., "Bank", or "Coffee Shop", the list of relevant companies will be shown to him. In this case the user has selected BB Airlines, and since, in this example, the details of this airline are available in the AS since the company was already register to the AS, they are automatically added to Company Name window and to the URL window, and an image related to it is displayed. The user can then add it to its list by pressing the "Add to iWant2C List" button. Alternatively, the user may deselect this Provider by hitting the "Clear" button. The user may also check his list by hitting the "Go to My iWant2C List" button, and may obtain help on various problems through the "Help" button.

According to a preferred embodiment of the invention, the user can put into his list of authorized senders any company identification (i.e., COMPANY ID) or other AS ID from which he wishes to receive messages. In this way, if the AS is requesting user confirmation of each new sender who wants to transfer messages to that specific user, the AS will then automatically transfer the name authorized by the user into the senders list without need for another confirmation. In this way, users can receive requests by e-mail from their friends or companies to authorize them, do so, following which the friends can immediately send him messages.

Figure 3:
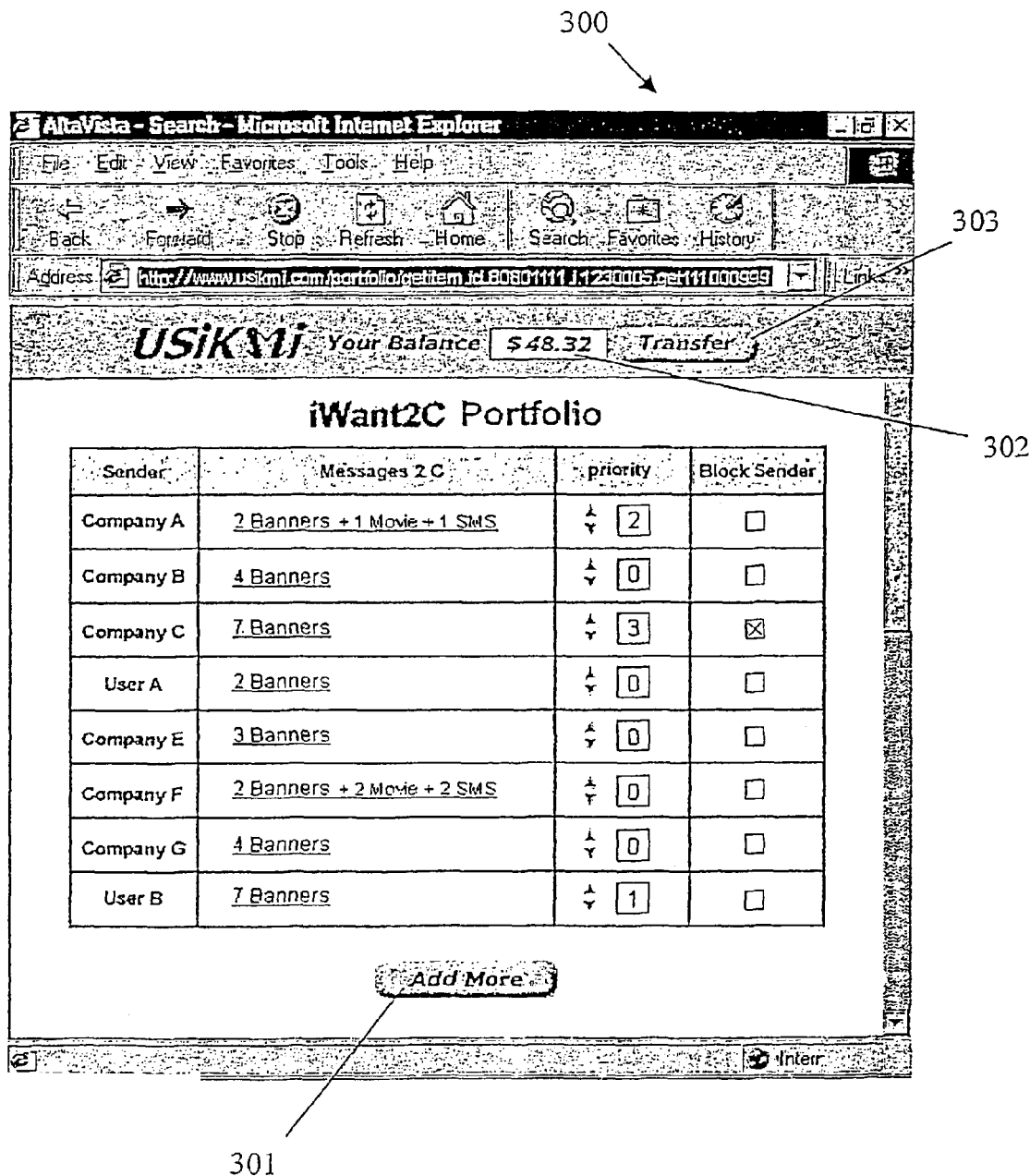
FIG. 3 is an example of a user's portfolio, according to a preferred embodiment of the invention.

The user's portfolio is shown in FIG. 3 for a specific user, according to a particular preferred embodiment of the invention. The portfolio (displayed on a page 300 of the user's web browser) shows the Provider's identity (indicated in FIG. 3 as "Sender"), the number of banners or any other type of message, e.g., advertisement movies, existing for each specific Provider and, in this particular embodiment of the invention, a priority. The priority can be set by the user. It is a measure of the preference of the user toward a specific Provider or any sender, and it determines that the user is interested to see this provider regardless of the amount of money that the provider offered for this message. The AS can determine how many priority options he wants to give to the user, if any. Without any priority being given by the AS, or any priority being marked by the user, the banners will be scheduled according to the prices offered by the providers or other mechanism the AS chooses. By pressing button 301 ("Add More") the user is transferred to the page of FIG. 2A, where he can add more Providers. Of course, the form of the user's portfolio is not limited to that exemplified herein, or to any other particular form, and many different forms of portfolio can be designed by the AS, to be more friendly or otherwise more desirable to the user.

The AS can also give the user the option to see the history of his messages, and it can give the user the option of naming different devices to which the user wishes to forward his messages. For example, if the user is surfing from a computer at home, a computer at work, a cable television at home, a mobile device (e.g., a mobile phone), the user can assign a different name to each device. The user can remotely control from his account the messages sent to different devices, and when changing a device (e.g., leaving work) he may prevent the device from receiving messages for a predetermined period of time, although it might still have the AS identity (cookie, plug-in, etc).

As stated, according to a preferred embodiment of the invention the consumer can delete any provider from the providers list at will. This procedure can be effected in any suitable way, and different ASs may choose to use different unsubscribe or removal schemes. For instance, removal from the user's portfolio may block the forwarding of messages to the user, or may delete the association of the user with a give service provider altogether. The AS can alert the provider that the user has deleted his name from his portfolio, and the provider can use this information as a sign that the user is dissatisfied with the service.

According to a preferred embodiment of the invention, the user can state to each provider whether he allows the provider to deliver third parties messages to him. The providers may want to send to the user messages and offers of third parties that are their suppliers or partners, and the AS can let the user decide whether he allows the provider to do so. The provider will, of course, offer the user benefits to cause him to agree to the receipt of such third parties messages. Of course, the user may also block such options.

According to the invention, the user participates in the advertising process by himself and, in fact, is in command of the process, since he will not see via the AS system messages originating from any advertisers that he has not chosen to see. This participation of the user is rewarded with benefits by the advertisers who provide different benefits to the user and even may pay for sending the messages, but it also helps the portal to sell the advertising space at higher prices, because a user that has not requested that personal messages be delivered to him using this communication channel via the AS, will be presented by the portal with other, non-specific advertisements, sold at lower prices. The AS system may be operated by a portal like Yahoo, AOL, Lycos, or by an advertising network on behalf of the portals. According to the particular embodiment shown in FIG. 3, the benefits the user obtain adds-up in the "Your Balance" window 302, whence they can be credited in to account in any of the providers, or can be transferred to any other location selected by the user, by pushing the "Transfer" button 303. Benefits may be credits of any kind, such as "points" in any commercial scheme, or any other kind of award such as free access to content provided by a portal, or movies (fully or partly free) by a Video-on-Demand provider.

According to a preferred embodiment of the invention, the provider can pay a fixed amount for all the messages that he sends through the AS, but he can add "content points" for each user according with his value to the company. This content points can be bought from the AS and shown to the user, and this is a convenient way to enhance his relationship with, and loyalty to the company.

Figure 4:
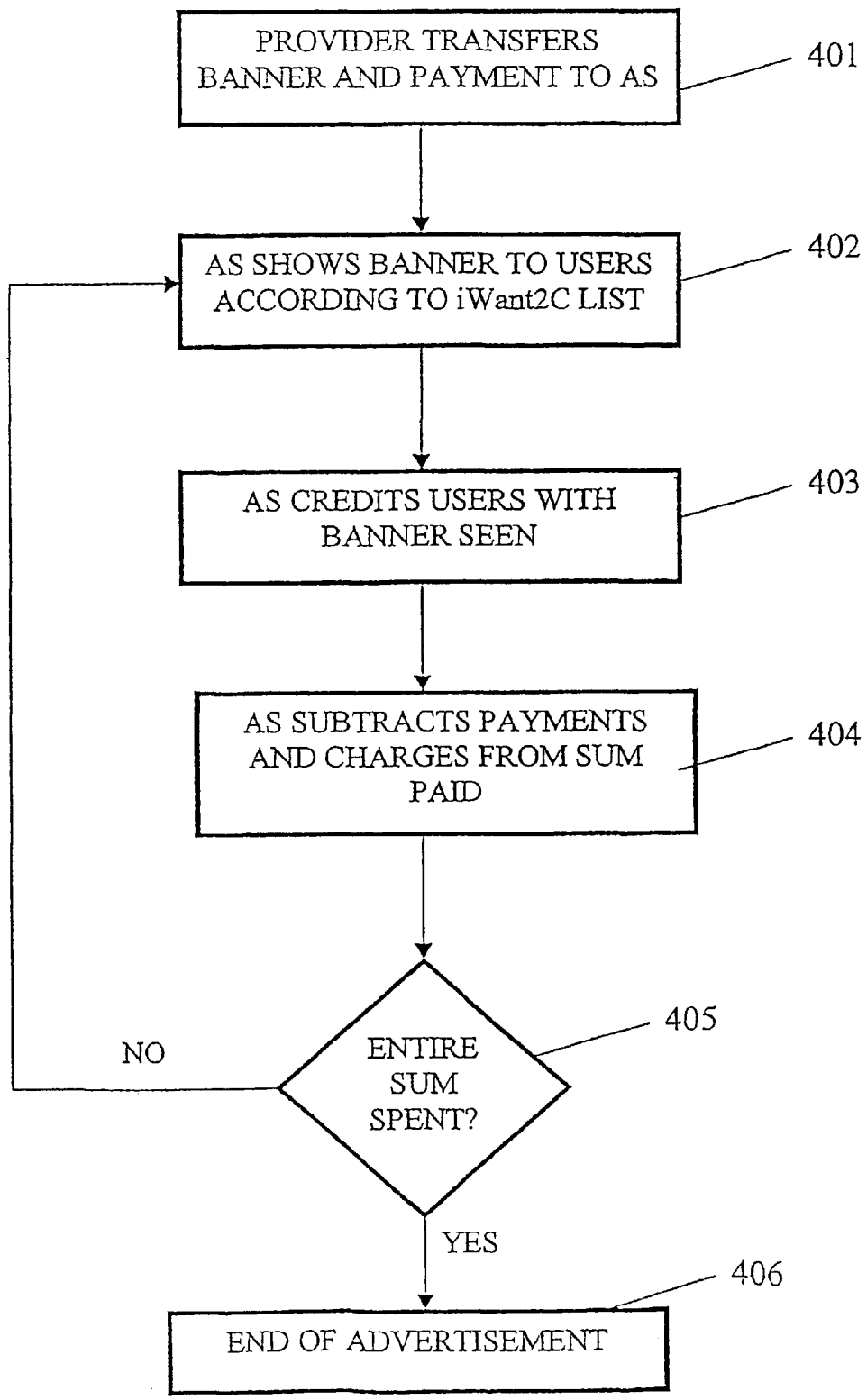
FIG. 4 is a flow-chart illustrating a payment procedure.

One of the possible processes involving payment of money, according to one preferred embodiment of the invention, is schematically illustrated in the flow-sheet of FIG. 4. A Provider that wishes to advertise submits to the AS the banner(s) as well as a payment for them (Step 401). An illustrative list of banners is shown in FIG. 5, which lists for each Provider (Company) a Banner No., which is an identification number for a given banner, the price to be paid by the Provider for each display of the banner to a surfer, and start and end dates, i.e., the date after which the banner will start being sent to the users, and the date after which the banner will be discarded from the AS database, and the number of desired distributions for each banner. The AS delivers the banner to a plurality of its users, either actively or passively (e.g., in the case of a portal, it pulls the banner from the AS server), according to the priorities determined for a specific user, as explained above (Step 402), and based on any other relevant criterion for a given system. Thus, a user who is not interested in viewing a banner of a given supplier will not see it through the AS system, though he might be exposed to banners of this specific provider that will be delivered in other, conventional advertising approaches used by the portal. When the surfer sees a given banner the surfer, the portal and the AS are credited the relevant amount according to a predefined criteria, as shown in FIG. 5, and the credited sums add up as shown at 302 in FIG. 3. The AS further subtracts from the payment made by the Provider (or from the budget defined by it) any sum payable to it (Step 404). Thus the AS acts also as a bookkeeper for the Provider. After each payment the AS checks whether all the budget of the provider for the given banner has been spent (Step 405). In the negative case, the AS continues to show the banner to appropriate users. If the entire budget has been spent, the AS terminates the use of the specific banner. The service provider may also limit his message sending process on a "budget per person" basis, e.g., may limit the benefits he provides to a single user. Of course, the AS is capable depending on the portal reporting tools, of providing the provider with a precise report on the number and the identity of the users who have seen its banner, and the number of times it has been shown to them. Thus, for example, the Provider knows exactly to which use the benefits he provided has been put.

The mechanism according to which the various banners are shown to the user will now be explained, using the following example. A registered user of a certain AS reached a certain media broadcaster that is connected to that AS network (i.e. portal or a content provider). If the portal chooses to check the availability of personal messages to this user, it creates a connection to the AS server. The AS server, according to a preferred embodiment of the invention, is familiar with the message senders from which the user requested to see messages.

The AS comprises a list of parameters, according to a set of rules agreed between it and the portal. This list of parameters can contain the total number of personal messages for that specific user, the total value of such messages, the number of user-to-user messages, the messages that bear no price (messages could bear no price if the AS allowed it, for example, if they are promotional messages, or user-to-user messages etc.) and the priority defined by the user for a specific provider.

The portal or an AD Network serving banners to this portal can decide to accept the list of banners, to reject it totally and to show banners from other sources, or to renegotiate on the fly some of the parameters offered by the AS, for example refusing to show the free messages, and taking only paid messages.

The AS assumes the negotiation with the portal succeeded, and needs now to serve the portal with messages. At this time, the AS can check queuing messages, for instance as shown in FIG. 5, and start delivering it one by one, or all the queuing messages together. As will be apparent from the above description, the exact procedure depends from the outcome of the negotiation of the AS with the portal, and the protocol upon which they agreed. Assuming that the AS transferred all the banners to the portal AD server, the AS will wait for a notice containing information relative to which of the banners have been served to the consumer. The portal sends the information concerning the served banners to the AS, and the AS can then execute a full billing procedure.

The system of the invention can also be used to provide communication between two or more users over the Internet. This can be done through the AS server used for advertisement purposes described above, or independently. The personal messages between users can be partly sponsored and divided between the message sponsor and the message sender, and it doesn't have to include a link like banners usually have, or it can have a link to the sponsor web site. Personal messages can have a small print on it "sent by AS 123456 member", and with each forwarding of a message between subscribers, the AS can change the sender's name, so that the new sender identity will be embedded in the message. As will be apparent to the skilled person, a system that enables users to put personal banners in a space that was used for advertising purposes only, creates a more close relation of users to a web site, and enhances attention of the users to the advertising space. Additionally, as explained, this creates a new means of communication between two surfers that is application or site independent. The skilled person will thus easily appreciate these unique advantages of the invention.

In order to permit communication between surfers, a user's and a sender's interface must be prepared, similar to that explained with reference to FIGS. 2C, 3 and 7. Each sender interface is built to deliver messages to any registered surfer via the AS. The surfer that receives a message can refuse to accept messages from this specific sender, temporary or permanently.

The user can send messages using a web browser, or other desktop application or browser extensions. The user application that sends the messages can be connected to an interface on the AS, that enables an inexperienced surfer to edit and create high quality messages. Examples for these applications are, e.g., a banner editor, a video editing software, a 3D animation editor, a set of ready made banners.

Figure 7:
FIG. 7 is a list of a user's contacts in the AS system.

In the right frame of FIG. 7 there is shown an example of a message sender list. The sender can edit this list by typing in his user ID in the AS system, or by registering users in his home page on the Internet. The user receiving the message list can refuse to be included in the list of any sender.

FIG. 6 shows three examples of messages. In FIG. 6A a "Happy Birthday Card" is shown, which also includes a link, 601, to a present (which is reached through a given URL). FIG. 6B is a simple communication notifying the recipient that tickets have been bought, and FIG. 6C contains a query, 602, that can be answered by clicking on the link.

Figure 6A:
FIG. 6 shows examples of messages that can be transmitted from one user to another over the system of the invention.
Figure 6B:
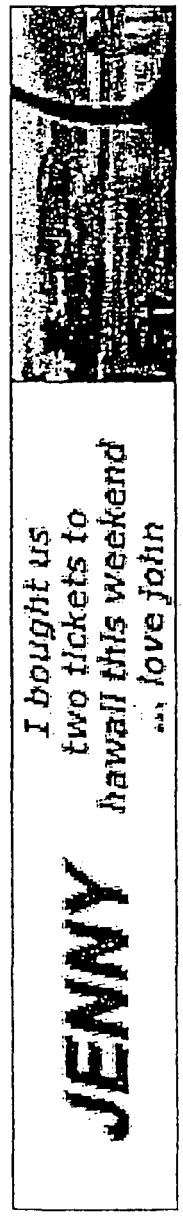
Figure 6C:
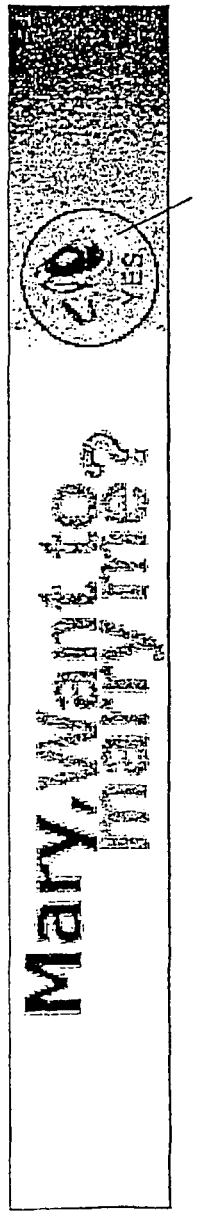
Figure 6D:
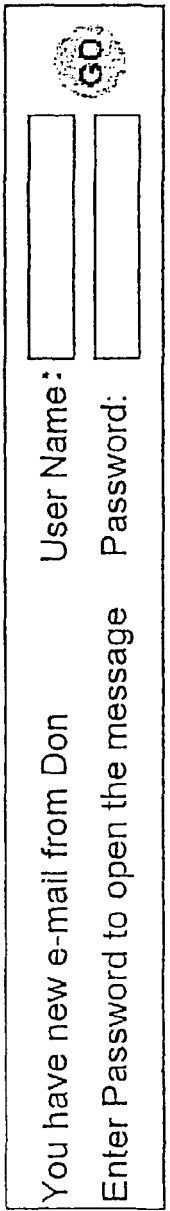

A more flexible e-mail messaging option is shown in FIG. 6D. The message (banner) sent to the user is a link to an e-mail message that can be accessed by keying-in the appropriate username and password. The e-mail message may have been generated on the AS system, or may be a message originating from any other source, such as an e-mail message from a regular e-mail Internet address, or a voice or text message from a cellular phone. These can be stored under the user's details in the AS system, and accessed through the banner of FIG. 6D.

Messages of the type shown above can be sent only by and to registered users in the AS system. A user will decide who are the persons (or entities) from which he is willing to receive messages, and will include them in his portfolio. This is illustrated in FIG. 7. In the left-hand side of FIG. 7 it is shown a page from Nir Aharon's Home page, in which friends can register him to their portfolio. The resulting list is shown in the right window of FIG. 7. Nir Aharon may now send messages over the AS system to every friend who has registered in his portfolio, and any friend or member the AS user ID details of whom are known to him.

Figure 8:
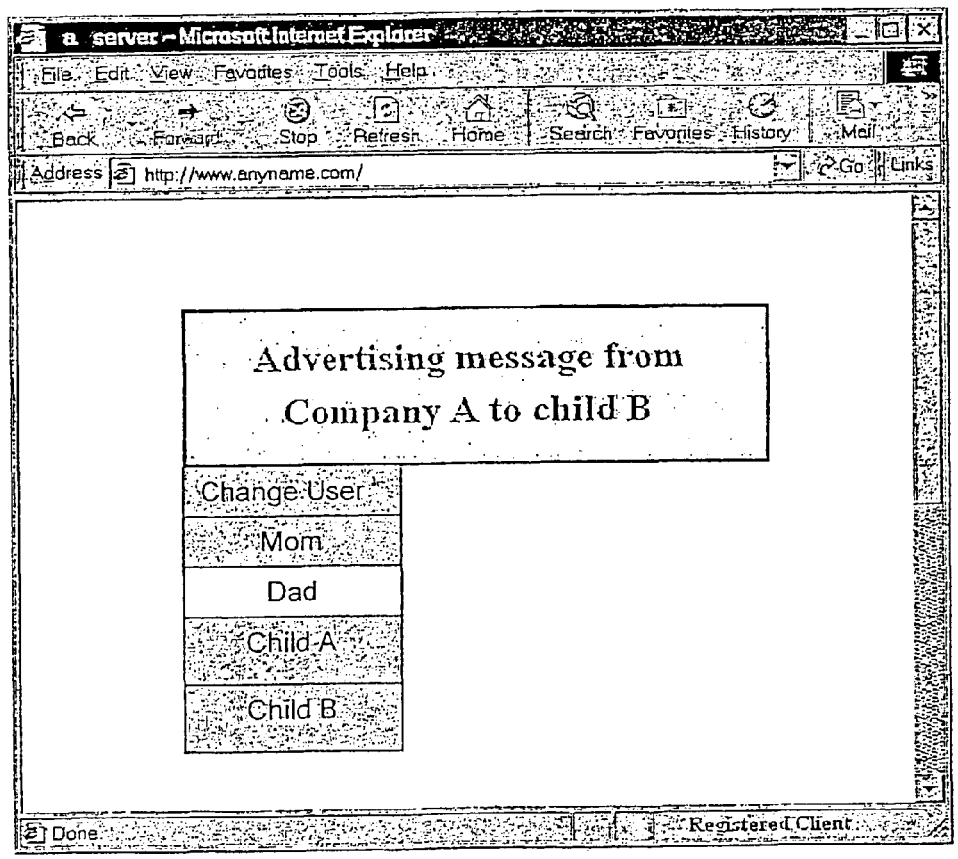
FIG. 8 shows how the portfolio of a user is changed, according to a preferred embodiment of the invention, on a terminal used by more than one user.
Figure 9:
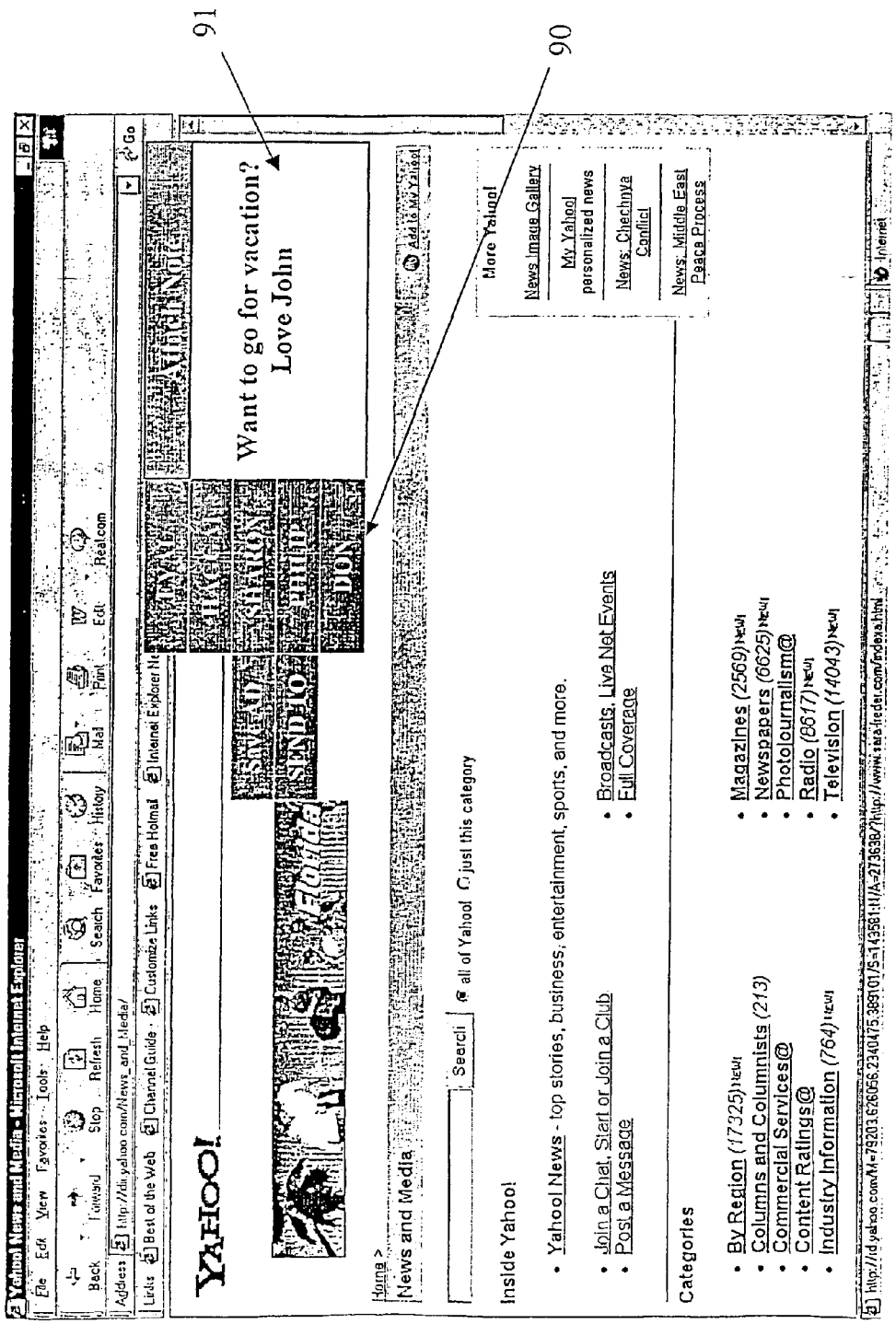
FIG. 9 illustrates how a user can forward a personal message that he has received via the AS, to another recipient.

In many instances, more than one person surf from the same computer at home or at work. According to a preferred embodiment of the invention the user is able to notify the AS the current identity of the person who is surfing from a computer at a given time. The notification can be effected in any suitable way, e.g., by an external client, and embedded source or subroutines, by ActiveX controls, or by any other suitable browser plug-in or components, or by instructions send from a set-top box to an AS sever of a cable operator. The AS will then change the messages appearance according to the portfolio of the person surfing the computer or watching television. This situation is illustrated in FIG. 8 and in part of FIG. 2C. In FIG. 8 an example is shown of a surfer who switches the active user from the message itself by HTML, script, or any other technology. In FIG. 2C an example is shown of a surfer who switches the active user by a desktop application 201, which, for example, could be a plug-in. According to a preferred embodiment of the invention the user is able to save the message he received for future retrieval, and is also able to forward the message to other users on his portfolio. This is done by the same technology described above. The "Send To"

and "Save AD" boxes, indicated at 90 in FIG. 9, can easily be made to appear, e.g., by clicking on the corner of the banner, or using a plug-in such as that illustrated in FIG. 2C. The banner can further be transmitted together with a note directed to one or more additional users, as shown at 91 in the figure. As will be appreciated by the skilled person, this permits to propagate the banner and to keep it viable on the net for a much longer period of time.

The invention is by no means limited to the use through any particular Internet connection system or terminal. According to a preferred embodiment of the invention the user is recognized by the AS system using a cookie saved on his terminal. However, a user may also access the system from another terminal, such as a public terminal. In this case, the user logs-in into his portfolio, and requests that the browser from which he is temporarily surfing be marked for a limited period of time (e.g., 2 hours). Thus, a "temporary cookie" (i.e., a cookie with a expiration date) is stored on the terminal, which is no longer valid after the given time, In this way, any non-authorized user accessing the terminal at a later time will not see the user's messages. Of course, the user may also void the cookie by actively logging-out of the system. According to this preferred embodiment of the invention, personal messages can follow a subscriber wherever he is located in the world. The skilled person will easily recognize the importance of this option to traveling surfers.

The person to person communication system must not necessarily be connected to an advertising messaging system, and it may exist as a stand alone system. For instance, a publisher (Portal) may provide such a system free of charge, in order to make users to pay attention to the advertising space. In this case the message senders will not necessarily be charged with money, or will be charged only after sending a certain amount of banners. A number of publishers can join and use this AS system, as described above, in order to provide a benefit to the users of this group of portals.

As will be appreciated by the skilled person this system provides capabilities never before obtainable in the Internet, and greatly enhances the usefulness of the World Wide Web as a convenient means of communication between individuals.

The invention permits to obtain other important advantages, and to provide useful systems. One example of such a system is the RMCS. This server functionality allows a corporation to carry out a rich media message sending using various advertising spaces in digital devices, via the AS. The RMCS functionalities described below can be:

1) divided into different components spread all over the company's systems, and
2) it can be concentrated in stand-alone computer software and hardware at the company location, connected to its operational databases and Customer Relationship Management (CRM) systems, or
3) it can be given as an Application Service Provider (ASP) service (which are third parties entities that manage and distribute services to registered surfers). These functionalities can be accessed via any terminal connected to the Internet or other suitable WAN.

When operating in this system, the company collects from the user his AS ID, and updates his user account in its internal systems, with that number. This number is equivalent to the customer E-mail address, cellular phone number etc. This information can be sent to the RMCS that checks with the AS if such user exists, or it can be sent to other applications that support the company web site. (Such applications from companies like BroadVision Inc., Vingette, etc.)

Upon its decision to initiate a message sending process, and to send messages to customers, the company will sort the consumer participating in that sending process, defining queries by any behavioral action or purchase activity stored with respect to the consumers in the company database.

Personalized messages with individual parameters presented in advertising space is obtained as follows:

At the company side, the company has to generate one or more data files, such as an eXtensible Markup Language (XML) data file, coupled with a template or set of templates marked with the exact places the data should be integrated for every specified user.

The RMCS keeps the content of the template files together with the data file, the content of these files comprises the connection between each customer and the relevant template. These files are then sent to the AS to be rendered at the proper time when the need for presenting a message based on that information to a specific customer.

The relaying of the messages is rendering all the messages after the data was constructed in the RMCS, hence creating a number of messages equivalent to the sum of the different templates times the number of customer per each template. For example, three different templates for one hundred customer, where fifty of them are destined to view all the templates, twenty five more will view only two templates, and the remaining twenty five will view only one template. In total there will be: 3*50+25*2+25*1=225 different personalized messages. These ready messages will then be sent to the AS to be displayed at the proper time to a specific customer.

Whenever a Portal, such as $PO_1$ informs the AS that it is looking for a message for a specific AS user, the message is either generated on the fly according to the information received from the data file and the template or pulled from the ready made pool, and is provided to the AD Server, or to the user directly if the AD Server makes a redirection of the user request for advertisement.

In order to create the company's messages sending process data, and to transfer it into a database of the AS, as a first step the person defining the messages sending process, builds the query, based on the company's database, and user behavior analysis (i.e. creating population segments), and inserts the result of this query (i.e. the customers population) through the RMCS API into the set of tables on the company's local server, whence it is sent to the AS.

An alternative method to send messages definitions is to initialize and manage the messages sending process through the RMCS, installed within a web site of the AS (i.e., ASP model).

Since both methods of sending messages require the particular predefined format for template based message sending (e.g., the XML file format), the company, that sends its message content data through the AS site should be able to create all the necessary data in the required format. This requires receiving all the relevant messages sending process data from the company's database and/or from an additional database, such as an advertising agency, and thereafter transferring this information to the AS, by a secure protocol. In general, security precautions are always taken when operating according to the invention, but these are conventional measures that are known in the art and, therefore, are not discussed herein in detail.

The RMCS may requests several types of data, such as the following:

Messages sending process Identifier and Description, filled by the company for process consistency.

AS IDs—the messages sending process's targeted population. Each messages sending process determines to which population (AS ID values) it is assigned. The RCMS apparatus supports the creation of the segments, based on predetermined groups (fields of interests, customer's "worth", income, age, sex, etc.).

Campaign Message Template—is a messages sending process message, designed by the AD Agency to be assigned to the targeted population. This can be a list of different Templates.

A Personalization flag that states whether the messages sending process message needs to be personalized. (If it equals "FALSE", it is a general message that does not need to be personalized).

The Media Type and Technology. There are several media types for the advertising implementation that the AS system supports: cellular phone, PC and iTV. (i.e., set-top-box). This information is essential for the message's generator (which will be discussed later).

The Messages sending process Start Date—is a date when the messages sending process should begin.

The Messages sending process Expiration Date—is the last date through which the messages sending process runs.

The Maximal Exposure Numbers—are the maximum number of the exposures that may be billed. If it comes prior to the expiration date for all the targeted population, the messages sending process stops.

The Messages sending process Rates, which can differ according to the viewing method, period of time, various rates, different users (or defined segments) and different portals.

The Minimal Time Difference—i.e. the time between the showing of different ads, transmitted to the user by a portal.

The Service Area based Advertisement Pattern—i.e. the particular model for showing the advertisements, according to the targeted user's geographical location.

The Time based Advertisements Pattern—i.e. the time period for the transmission of targeted advertisements.

Advertisement Type—it consolidates all kinds of exposures ("click through", "view", "download", "survey banners" etc.) and allows rating them according to the pattern. If it is a "survey" type banner, it also contains Survey Code and Survey Value (which will be discussed later).

According to an embodiment of the invention, the RMCS may decodes the pre-received layout definition in order to automate the dynamic insertion of the related information, for example, the username, the user's age, etc., into the pre-prepared template, in a supported format, such as Graphic Interchange Format (GIF), Motion Picture Experts Group (MPEG), Flash (of Macromedia Inc.), Short Message Service (SMS) etc. For example, the template layout for the image format can be defined as the following:

The layout structure of the template contains the essential information of the attributes describing where the relevant data will "be pasted" into the final advertisement:

Positions of the text, relative to the whole layout (x,y,z positions) or maximum length.

Content of the text (for example, username, age, etc.) that should be provided within population file information.

Font of the text.

The message's generator, in the RMCS, determines what will be inserted, where it will be inserted etc. It refers to the different media types and the technological solutions for each of the mentioned types. For instance, there are several generators for the different types of the cellular phone, according to the application kind, such as WAP, I-mode and other technologies. In practice, the message generator consolidates the above messages sending process characteristics with the Publisher demands to further real time messages sending process implementation. It might also contain only an XML file with the data coupled with a template file like in the instance of Flash based messages where no engine for creation is necessary.

According to a further embodiment of the present invention, the RMCS may also operate as a customer satisfaction and opinion measurement tools. In this embodiment, a customer may reply (to what he has been asked for from the RMCS) from his interface (e.g., a PC, a TV remote control etc.), and still remains in the same web pages or television program. The RMCS receives the answers and transform answers into a report (e.g. graph) for managerial purposes, and updates the user account with his answers. The company is able to execute another messages sending process that relies on answers the customer previously answered. For example: customer 'A' may be asked, "What do you think of This Cellular Phone?", and his answer will be added to his customer account at the company database.

If a company has its own CRM system, its messages sending process manager may use the data from the CRM system to create a template based message process and launch it via the AS through the RMCS installed on its local server. All the relevant resulting logs from the messages sending process will be relayed back to the CRM system for further analysis. These logs can contain messages sending process data, e.g. surveys to which the user responds, by clicking a choice in a multiple answer selection type of question, number of exposures, time of exposure etc.

Parameters will be sent from the AS though the RMCS back into the provider's CRM system, for instance:

Messages sending process Identifier and Description—the company's primary description of the messages sending process.

Template(s) Identifier—the company's template(s) identifier(s).

AS ID—the targeted user identifier.

Advertisement Type—an exposure type (in this case, "survey banner"—a form of a banner with a multiple answer choice from where the surfer will choose one answer, and that choice will be kept as part of the messages sending process data).

Response Code—the choice identifier.

Response Value—the value, chosen by the surfer (targeted user).

According to another further embodiment of the present invention, the system may have an additional component that will operate as a customer defection sensitivity engine. This component can be implemented on the AS and on the RMCS, and it may fulfill a combined solution to alert a company that a customer is dissatisfied and is not willing to receive messages from it any more. The user will mark the company on his portfolio with "Block Sender" or "Delete Company", and the AS will send to the RMCS an alert indicating the customer AS ID. The RCMS will match the AS ID to the company ID and will freeze or delete the customer AS ID.

Following such action, the RMCS will search for other automatic procedures defined for that customer segment. For example, "IF The 'Customer ID' 'annual purchases' are higher than 1500USD, then alert customer service clerk D (e.g., by e-mail)".

According to another embodiment of the present invention, a third-party joint ventures may also use the RMCS for sending messages. This optional capability of the RMCS is used in order to enable partners and suppliers of the company to execute messages sending processes via the AS to customers, following any interaction with the company.

The RMCS will allow queries to limited data on the company database, following a messages sending process via the AS. For example: A Hotel chain "Best Resorts" cooperating with an international Airline will present the following query to the RMCS "All passengers traveling to Germany" and "from 1/8/2001 to 15/9/2001" and "first Class" And have "AS ID". The result will be for example "1198 customers". The RMCS will store a file with the AS ID numbers in a separate file "Best Resorts Hotels offer for 8-9/2001 Travelers to Germany". The RMCS will send this file with the proper advertisement given by Best Resorts to the AS. A third party can cover the messages sending process payment, and the RMCS file sent to the AS will reflect it in the appropriate place. Surfers will be offered the chance to pre-block this option when adding a company.

According to another preferred embodiment of the invention any advertiser who does not have access to a customer's database will request from another entity, which does have access to the data base, to perform a "manual" selection of data for a given messages sending process. The advertiser can make its request by e-mail and the messages will be forwarded on the basis of the request.

While embodiments of the invention have been described by way of illustration, it will be understood that the invention can be carried out by persons skilled in the art with many modifications, variations and adaptations, without departing from its spirit or exceeding the scope of the claims.

The invention claimed is:

1. A method for messaging over a data network, comprising the steps of:
   a) providing an Administration Server (AS) in which user portfolios are stored, said AS being in communication with a terminal belonging to a user;
   b) allowing every registered user that browses a portal or a web site over said data network, to generate and update one or more user portfolio(s) containing information relative to Providers or individuals, messages of whom the user is willing to view; and
   c) allowing specific users to communicate with other specific users or specific Providers on a user-to-user communication basis, by sending messages directly from the user browser and displaying personalized or different messages to one or more users on their terminals and according to the information contained in their user portfolio, wherein said messages are displayed within a space of a web page belonging to said portal or web site, in which banners are normally displayed or destined to be displayed without changing the view of the user browser,
   wherein instead of the banner, each user sees a personal message, adapted to him according to said user-to-user communication basis.

2. The method according to claim 1, wherein whenever the messages have a commercial value, further comprising:
   a) providing benefit(s) to the user for messages displayed to him; and
   b) debiting the Provider for messages displayed to said one or more users.

3. The method according to claim 1, further comprising:
   a) providing one or more message templates to an additional server;
   b) selecting one or more customer from a data base, to which the templates should be sent;
   c) generating one or more messages by attaching one or more templates to said selected one or more customer; and d) transferring said one or more generated messages to the AS, from which said messages should be sent to one or more selected customer.

4. The method according to claim 3, wherein the data base is a local or remote client data base.

5. The method according to claim 1, wherein the data network is the Internet.

6. The method according to claim 1, wherein the information contained in the user's portfolio comprises an indication of a viewing priority for each Provider.

7. The method according to claim 6, wherein the message comprises an advertisement.

8. The method according to claim 7, wherein the terminal is a device with Internet connectivity or with any other digital media connectivity.

9. The method according to claim 8, wherein the terminal is selected from a PC, a hand-held device and a cellular telephone.

10. The method according to claim 9, wherein the advertisement is in a form that can be viewed on a graphical, textual or video application which enables to view messages on the Internet.

11. The method according to claim 10, wherein the advertisement is in a form that can be viewed on a web browser page.

12. The method according to claim 11, comprising attaching to messages to be displayed start and end dates before and after which the message cannot be displayed.

13. The method according to claim 12, comprising attaching to messages to be displayed differential values for specific customers or groups of customers.

14. A system for messaging over a data network, particularly the Internet, comprising:
  a) an Administration Server (AS) provided with storage means in which user portfolios are stored;
  b) a terminal belonging to a user, said terminal being in communication with said AS;
  c) means for allowing every registered user that browses a portal or a web site over said data network, to generate and update user portfolios containing information relative to the Providers and the individuals of which the user is willing to receive their messages while exposed to digital media; and
  d) display means associated with the user's terminal, for sending messages directly from the user browser and displaying personalized or different messages to said one or more users said messages according to the information contained in the user portfolio, wherein said messages are displayed within a space of a web page belonging to said portal or web site, in which banners are normally displayed or destined to be displayed without changing the view of the user browser,
  wherein instead of the banner, each user sees a personal message, adapted to him according to said user-to-user communication basis.

15. The system according to claim 14, wherein whenever the messages displayed have a commercial value, further comprising:
  a) means for providing benefit(s) to the user for said messages displayed to him; and
  b) means for debiting the Provider for said messages displayed to said one or more users.

16. The system according to claim 14, further comprising an additional server, said additional server comprising means for generating messages.

17. A method for communicating between two or more users of a data network, particularly of the Internet, comprising the steps of:
  a) providing an Administration Server (AS) in which user portfolios are stored, said AS being in communication with a terminal belonging to a user;
  b) allowing every registered user that browses a portal or a web site over said data network, to generate and update a user portfolio containing information relative to surfers the messages originating from whom or which the user is wiling to view; and
  c) allowing specific users to communicate with other specific users or specific Providers on a user-to-user communication basis, by sending messages directly from the user browser and displaying personalized or different messages to one or more users on their terminal said messages according to the information contained in the user portfolio, wherein said messages are displayed within a space of a web page belonging to said portal or web site, in which banners are normally displayed or destined to be displayed without changing the view of the user browser,
  wherein instead of the banner, each user sees a personal message, adapted to him according to said user-to-user communication basis.

18. The method according to claim 17, wherein the message is in a form that can be viewed on a graphical or textual application which enables to view messages on the Internet.

19. The method according to claim 18, wherein the message is in a form that can be viewed on a web browser.

20. The method according to claim 19, wherein the user is recognized by saving a cookie on his terminal.

21. The method according to claim 20, wherein the user accesses the AS system from a temporary terminal, such as a public terminal, in which the user logs-in into his portfolio, and requests that the browser from which he is temporarily surfing be identified as belonging to him for a limited period of time, whereby a "temporary cookie" is stored on said temporary terminal.

22. The method according to claim 21, wherein the user voids the cookie by actively logging-out of the system.

23. The system according to claim 15, comprising means for notifying the AS of a current identity of the person who is surfing from a computer at a given time.

24. The system according to claim 23, wherein the means for notifying the AS comprise one or more of an external client, and embedded source or subroutines, ActiveX controls, or suitable browser plug-ins or components.

25. The system according to claim 24, which is a stand alone person-to-person communication system, which is not connected to an advertising messaging system.

26. The method according to claim 1, wherein the order or the frequency in which messages are displayed to a user are determined by the user himself.

27. The method according to claim 26, wherein the user determines the order or frequency by indicating a preference in his portfolio.

28. A method for messaging over a data network, comprising the steps of:
  a) allowing every registered user that browses a portal or a web site over said data network, to generate and update one or more user portfolio(s) containing information relative to Providers or individuals the messages of which the user is willing to view; and
  b) allowing specific users to communicate with other specific users or specific Providers on a user-to-user communication basis, by sending messages directly from the user browser and displaying personalized or different messages to one or more users on their terminal messages according to the information contained in the user portfolio, wherein said messages are displayed in a space of a web page belonging to said portal or web site, in which banners are normally displayed or destined to be displayed without changing the view of the user browser, and optionally providing benefit(s) to the user for viewing said messages.

29. The method according to claim 28, wherein the user generation or the update of the user's portfolio is effected via the user's browser.

30. The method according to claim 29, wherein the user generation or the update of the user's portfolio is carried out by a plug-in of the browser.

31. The method according to claim 30, wherein the generation or the update of the user's portfolio is carried out by functionality built-in the browser.

32. The method according to claim 28, wherein the user's portfolio is stored in a user's browser or in a location accessible by it.

33. The method according to claim 28, wherein the user's portfolio is stored at a portal level.

34. The method according to claim 28, wherein the message is a message received by a recipient and forwarded to one or more additional recipient(s).

* * * * *